(12) United States Patent
Montgomery et al.

(10) Patent No.: US 6,599,956 B2
(45) Date of Patent: Jul. 29, 2003

(54) NON-CRYSTAL-FORMING OLIGOMERS FOR USE IN RADIATION-CURABLE FIBER OPTICE COATINGS

(75) Inventors: Eva I. Montgomery, Woodstock, IL (US); Jeanette L. Ward, West Chicago, IL (US); Michael R. Clark, Jacksonville, FL (US)

(73) Assignee: DSM N.V. (NL)

( * ) Notice: Subject to any disclaimer, the term of this patent is extended or adjusted under 35 U.S.C. 154(b) by 0 days.

(21) Appl. No.: 10/035,739

(22) Filed: Dec. 26, 2001

(65) Prior Publication Data

US 2002/0147248 A1 Oct. 10, 2002

Related U.S. Application Data

(60) Provisional application No. 60/259,023, filed on Dec. 29, 2000.

(51) Int. Cl.[7] .............................................. C08G 18/67
(52) U.S. Cl. ............................. 522/93; 522/97; 528/49; 528/75; 560/25; 428/375; 428/378
(58) Field of Search ....................... 522/93, 97; 528/49, 528/75; 560/25; 428/378, 375

(56) References Cited

U.S. PATENT DOCUMENTS

| | | | |
|---|---|---|---|
| 3,364,059 A | 1/1968 | Marzocchi | 117/72 |
| 3,980,390 A | 9/1976 | Yamamoto et al. | 350/96 |
| 4,088,498 A | 5/1978 | Faust | 96/115 |
| 4,120,721 A | 10/1978 | Ketley et al. | 96/36 |
| 4,125,644 A | 11/1978 | Ketley et al. | 427/36 |
| 4,131,602 A | 12/1978 | Hodakowski et al. | 528/49 |
| 4,133,723 A | 1/1979 | Howard | 204/15 |
| 4,139,436 A | 2/1979 | Jasani | 204/159 |
| 4,151,055 A | 4/1979 | Stueben et al. | 204/159 |
| 4,180,474 A | 12/1979 | Schuster et al. | 252/188 |
| 4,188,455 A | 2/1980 | Howard | 428/423 |
| 4,192,762 A | 3/1980 | Osborn | 252/182 |
| 4,210,713 A | 7/1980 | Sumiyoshi et al. | 430/284 |
| 4,255,243 A | 3/1981 | Coqueugniot et al. | 204/159 |
| 4,264,752 A | 4/1981 | Watson, Jr. | 525/467 |
| 4,291,095 A | 9/1981 | Chase et al. | 428/391 |
| 4,304,923 A | 12/1981 | Rousseau | 560/26 |
| 4,324,575 A | 4/1982 | Levy | 65/3 |
| 4,344,982 A | 8/1982 | Chen | 427/44 |
| 4,374,984 A | 2/1983 | Eichler et al. | 544/80 |
| 4,377,679 A | 3/1983 | Schmidle | 528/75 |
| 4,396,645 A | 8/1983 | Kimura et al. | 427/163 |
| 4,424,252 A | 1/1984 | Nativi | 428/209 |
| 4,444,846 A | 4/1984 | Zalucha et al. | 428/425 |
| 4,472,019 A | 9/1984 | Bishop et al. | 350/96 |
| 4,474,830 A | 10/1984 | Taylor | 427/54 |
| 4,479,984 A | 10/1984 | Levy et al. | 427/54 |
| 4,482,204 A | 11/1984 | Blyler, Jr. et al. | 350/96 |
| 4,508,916 A | 4/1985 | Newell et al. | 556/420 |
| 4,512,340 A | 4/1985 | Buck | 128/90 |
| 4,525,258 A | 6/1985 | Watanabe et al. | 204/159 |
| 4,564,666 A | 1/1986 | Fieder et al. | 522/33 |
| 4,581,407 A | 4/1986 | Schmid | 524/548 |
| 4,608,400 A | 8/1986 | Yokoshima et al. | 522/96 |
| 4,608,409 A | 8/1986 | Coady et al. | 524/199 |
| 4,609,718 A | 9/1986 | Bishop et al. | 528/49 |
| 4,624,994 A | 11/1986 | Ansel | 525/440 |
| 4,629,287 A | 12/1986 | Bishop | 350/96 |
| 4,639,080 A | 1/1987 | Kimura et al. | 350/96 |
| 4,682,850 A | 7/1987 | White et al. | 350/96 |
| 4,690,501 A | 9/1987 | Zimmerman et al. | 350/96 |
| 4,690,502 A | 9/1987 | Zimmerman et al. | 350/96 |
| 4,694,052 A | 9/1987 | Hirose et al. | 525/454 |
| 4,707,076 A | 11/1987 | Skutnik et al. | 350/96 |
| 4,717,739 A | 1/1988 | Chevreux et al. | 522/79 |
| 4,720,529 A | 1/1988 | Kimura et al. | 525/454 |
| 4,732,951 A | 3/1988 | Ahne et al. | 525/528 |
| 4,733,941 A | 3/1988 | Broer et al. | 350/96 |
| 4,741,958 A | 5/1988 | Bishop | 428/394 |
| 4,761,136 A | 8/1988 | Madhavan et al. | 433/214 |
| 4,780,486 A | 10/1988 | Lee et al. | 522/14 |
| 4,782,129 A | 11/1988 | Moschovis et al. | 528/49 |
| 4,783,544 A | 11/1988 | Yokoshima et al. | 558/267 |
| 4,794,133 A | 12/1988 | Moschovis et al. | 524/99 |
| 4,798,852 A | 1/1989 | Zimmerman et al. | 522/96 |
| 4,806,574 A | 2/1989 | Krajewski et al. | 522/96 |
| 4,812,489 A | 3/1989 | Watanabe et al. | 522/42 |
| 4,835,057 A | 5/1989 | Bagley et al. | 428/391 |
| 4,844,604 A | 7/1989 | Bishop et al. | |
| 4,849,462 A | 7/1989 | Bishop | 522/97 |
| 4,873,139 A | 10/1989 | Kinosky | 428/341 |
| 4,902,440 A | 2/1990 | Takeyama et al. | 252/182 |
| 4,904,051 A | 2/1990 | Broer et al. | 350/96 |
| 4,908,297 A | 3/1990 | Head et al. | 430/284 |
| 4,932,750 A | 6/1990 | Ansel et al. | 350/96 |
| 4,962,992 A | 10/1990 | Chapin et al. | 350/96 |

(List continued on next page.)

FOREIGN PATENT DOCUMENTS

| | | |
|---|---|---|
| EP | 0 228 854 A2 | 7/1987 |
| EP | 0 780 712 | 6/1997 |
| EP | 1 134 201 A1 | 9/2001 |
| JP | 60-176953 | 9/1985 |
| JP | 6354416 | 9/1988 |

OTHER PUBLICATIONS

"Effect Of Chemical Environments On UV Curable Optical Fiber Coatings," by Chander P. Chawla et al., International Wire & Cable Symposium Proceedings 1991, pp. 141–148.

"Studies of Structure and Properties of Photocrosslinked Polyurethane Acrylates," by Jie Dai et al., pp. 174–184; 1991.

Primary Examiner—Rachel Gorr
(74) Attorney, Agent, or Firm—Leydig, Voit & Mayer, Ltd.

(57) ABSTRACT

A radiation-curable coating composition for an optical fiber comprising a reactive functionality-terminated urethane oligomer, wherein said oligomer comprises the reaction product of (i) a semi-crystalline polyol, and (ii) a non-crystalline polyol in the mole ratio of semi-crystalline polyol to non-crystalline polyol of at least about 1:1, (iii) at least one isocyanate, and (iv) an endcapping compound capable of supplying the functionality terminus.

23 Claims, No Drawings

U.S. PATENT DOCUMENTS

| | | | |
|---|---|---|---|
| 4,973,611 A | 11/1990 | Puder | 522/42 |
| 4,992,524 A | 2/1991 | Coady et al. | 528/49 |
| 5,015,068 A | 5/1991 | Petisce | 350/96 |
| 5,015,709 A | 5/1991 | Birkle et al. | 526/279 |
| RE33,677 E | 8/1991 | Vazirani | 385/123 |
| 5,093,386 A | 3/1992 | Bishop et al. | 522/96 |
| 5,104,433 A | 4/1992 | Chapin et al. | 65/3 |
| 5,110,889 A | 5/1992 | Hibgie et al. | 526/320 |
| 5,139,872 A | 8/1992 | Lapin et al. | 428/375 |
| 5,146,531 A | 9/1992 | Shustack | 385/128 |
| 5,181,269 A | 1/1993 | Petisce | 385/128 |
| 5,199,098 A | 3/1993 | Nolan et al. | 385/128 |
| 5,219,896 A | 6/1993 | Coady et al. | 522/96 |
| 5,229,433 A | 7/1993 | Schunck et al. | 522/96 |
| 5,336,563 A | 8/1994 | Coady et al. | 428/375 |
| 5,352,712 A | 10/1994 | Shustack | 522/31 |
| 5,496,870 A | 3/1996 | Chawla et al. | 522/90 |
| 5,527,835 A | 6/1996 | Shustack | 522/42 |
| 5,538,791 A | 7/1996 | Shustack | 428/392 |
| 5,587,403 A | 12/1996 | Shustack | 522/42 |
| 6,014,488 A | 1/2000 | Shustack | 385/128 |
| 6,093,786 A | 7/2000 | Kelsey | 528/271 | ns assemblies are subject to conditions of low temperature, for example, in outdoor telecommunications installations.

NON-CRYSTAL-FORMING OLIGOMERS FOR USE IN RADIATION-CURABLE FIBER OPTICE COATINGS

This application claims the benefit of U.S. Provisional Application No. 60/259,023, filed Dec. 29, 2000.

BACKGROUND OF THE INVENTION

1. Field of the Invention

The present invention relates generally to optical fiber coating compositions, and, more particularly, to fiber optic coating compositions that include a non-crystal-forming oligomer, and to optical fibers coated with such compositions.

2. Description of Related Art

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and an overlaying coating is called the "outer primary coating." In some references, the inner primary coating is also called simply the "primary coating" and the outer primary coating is called a "secondary coating." Inner primary coatings are softer than outer primary coatings.

Single-layered coatings ("single coatings") can also be used to coat optical fibers. Single coatings generally have properties (e.g., hardness) which are intermediate to the properties of the softer inner primary and harder outer primary coatings.

The relatively soft inner primary coating provides resistance to microbending which results in attenuation of the signal transmission capability of the coated optical fiber and is therefore undesirable. The harder outer primary coating provides resistance to handling forces such as those encountered when the coated fiber is ribboned and/or cabled.

Optical fiber coating compositions, whether they are inner primary coatings, outer primary coatings, or single coatings, generally comprise, before cure, a mixture of ethylenically-unsaturated compounds, often consisting of one or more oligomers dissolved or dispersed in liquid ethylenically-unsaturated diluents and photoinitiators. The coating composition is typically applied to the optical fiber in liquid form and then exposed to actinic radiation to effect cure.

For the purpose of multi-channel transmission, optical fiber assemblies containing a plurality of coated optical fibers have been used. Examples of optical fiber assemblies include ribbon assemblies and cables. A typical ribbon assembly is made by bonding together a plurality of parallel oriented, individually coated optical fibers with a matrix material. The matrix material has the function of holding the individual optical fibers in alignment and protecting the fibers during handling and installation. Often, the fibers are arranged in "tape-like" ribbon structures, having a generally flat, strand-like structure containing generally from about 2 to 24 fibers. Depending upon the application, a plurality of ribbon assemblies can be combined into a cable which has from several up to about one thousand individually coated optical fibers. An example of a ribbon assembly is described in published European patent application No. 194891. A plurality of ribbon assemblies may be combined together in a cable, as disclosed, for example, in U.S. Pat. No. 4,906, 067.

The term "ribbon assembly" includes not only the tape-like ribbon assembly described above, but optical fiber bundles as well. Optical fiber bundles can be, for example, a substantially circular array having at least one central fiber surrounded by a plurality of other optical fibers. Alternatively, the bundle may have other cross-sectional shapes such as square, trapezoid, and the like.

Coated optical fibers whether glass, or as has come into use more recently, plastic, for use in optical fiber assemblies can be subject to low temperature, and thus the coating must be stable at low temperature to avoid attenuation of the signal in the fiber optic. Moreover, coating compositions that are not stable at low temperatures are prone to crystallize or solidify when transported or stored at low temperatures. Before the coatings can be applied to a fiber they must be warmed sufficiently, as for example, by standing at room temperature, to melt the solids in order to avoid attenuation problems or the like when the coating is applied. Coatings for optical fibers heretofore known have not been entirely satisfactory in terms of their low temperature stability.

Despite the efforts of the prior art to provide materials and methods to impart low temperature stability optical fibers, there remains a need for coatings which are stable at low temperature while satisfying the many diverse requirements desired, such as, improved curing and enhanced cure speeds, and versatility in application while still achieving the desired physical characteristics of the various coatings employed. More particularly, there remains a need for a fiber-optic coating composition generally, and in particular, for an inner primary coating composition, which is stable at low temperature and which freezes below 0° C., or melts below 0° C. or both.

SUMMARY OF THE INVENTION

The present invention provides an improved radiation-curable coating composition having a freezing temperature below about 0° C. for coating optical fiber. The coating composition of the present invention comprises a reactive functionality-terminated urethane oligomer which comprises the reaction product of (i) a semi-crystalline polyol, (ii) a non-crystalline polyol, (iii) at least one isocyanate, and (iv) an endcapping compound capable of supplying the reactive functionality terminus. The oligomer is formed by reacting the semi-crystalline polyol and the non-crystalline polyol in the presence of isocyanate. In one embodiment of the invention, the mole ratio of the semi-crystalline polyol to the non-crystalline polyol is between 1:10 and 10:1, preferably between 3:1 and 1:6, more preferably between 2:1 and 1:3. Preferably, the stoichiometry of the respective components is chosen such that, on average, at least 50% of the oligomers contains a non-crystalline polyol. In another embodiment of the invention, the mole ratio of semi-crystalline polyol to non-crystalline polyol is at least 1:1 in the reaction process used to form the oligomer. The mole ratio of semi-crystalline polyol to non-crystalline polyol is also desirably at least 1:1 in the resulting oligomer.

In some embodiments of the invention, the composition has a freezing temperature below about 0° C., a melting temperature below 0° C., or it has both a freezing and melting temperature below 0° C. In other embodiments, the composition has no observable freezing temperature or melting temperature, above about −60° C.

The coating composition of the present invention is more versatile than previously known compositions because of its low freezing temperature and/or low melting temperature, despite the fact that the oligomer contains a polyol that is prone to crystallization. The coating composition is particularly useful in applications where optical fiber and ribbon assemblies made using such fiber are subjected to cold weather and freezing. Advantageously, the coating compositions of the present invention also can be handled more efficiently prior to use if they have been subjected to cold weather because they do not have to be thawed before use. The coating composition of the present invention can be used for an inner primary coating, an outer primary coating, single coatings, buffering coatings, a matrix material or the base for an ink (or colored) coating. Use of the coating composition of the present invention as an inner primary coating, outer primary coating, single coating or ink coating will minimize or even avoid adverse attenuation effects.

These and other advantages of the present invention, as well as additional inventive features, will be apparent from the description of the invention. The invention may be best understood with reference to the detailed description of the preferred embodiments.

DETAILED DESCRIPTION OF PREFERRED EMBODIMENTS

In accordance with the present invention, there is provided an improved radiation-curable coating composition for coating optical fiber which has a freezing temperature below about 0° C., or a melting temperature below about 0° C., or which has both a freezing temperature and a melting temperature below about 0° C. In a preferred embodiment of the invention, the radiation-curable coating composition has a freezing temperature and a melting temperature below 0° C. In other preferred embodiments, the composition of the present invention has no observable freezing temperature, or melting temperature, above about −60° C. The coating composition includes a reactive functionality-terminated urethane oligomer which is the reaction product of a semi-crystalline polyol, a non-crystalline polyol, an isocyanate and an endcapping compound which is capable of providing the reactive-functionality terminus.

Optical fiber coatings, as used herein, means any composition that is used to cover optical waveguides. Optical fiber coatings, as is known in the art, include inner primary coatings, outer primary coatings, single coatings, buffering coatings, and matrix materials. Optical fiber coatings are typically radiation-curable compositions that contain one or more radiation-curable oligomers or monomers having at least one functional group capable of polymerization when exposed to actinic radiation. The present invention provides an improved radiation-curable oligomer which improves the low temperature stability of the coating composition by lowering the freezing point of the composition. Additionally, optical fiber coatings typically include at least one reactive diluent which also includes at least one functional group capable of polymerization when exposed to actinic radiation. As is known in the art, optical fiber coatings contain different types of materials that can be varied to achieve performance characteristics depending on the function of the coating composition, as described above.

Examples of suitable radiation-curable compositions which may be used variously to form the coating compositions described above include those which are disclosed, for example, in U.S. Pat. Nos. 4,624,994, 4,682,851, 4,782,129, 4,794,133, 4,806,574, 4,849,462, 5,219,896 and 5,336,563, all of which are incorporated herein by reference. The novel oligomers of the present invention can be used in such coatings to improve their low temperature stability.

In accordance with one embodiment of the invention, the novel oligomer comprises a urethane with a reactive functionality. The oligomer comprises the reactive product of a semi-crystalline polyol, a non-crystalline polyol, an isocyanate and an endcapping compound which is capable of supplying the reactive functionality terminus of the oligomer. The oligomer is preferably prepared such that the reactive functionality is at the terminal ends of the oligomer, the reactive functionality is linked to the polyol through an isocyanate and the semi-crystalline and non-crystalline polyols are linked to the isocyanates and to each other through an isocyanate. The reaction of the isocyanate and polyol forms the urethane linkages of the oligomer. The precise arrangement of the semi-crystalline and non-crystalline polyols in the oligomer is not critical to the low temperature stability of the oligomer, provided sufficient non-crystalline polyol is included in the oligomer that the oligomer does not crystallize.

Different types and combinations of semi-crystalline and non-crystalline polyols can be used to form oligomers with varying degrees of crystallinity in the non-crystalline oligomer as desired. In some embodiments of the present invention, the combination of semi-crystalline and non-crystalline polyols forms a non-crystalline oligomer that has a freezing temperature below 0° C., or a melt temperature of less than 0° C., or both a freezing temperature and a melting temperature below 0° C. Thus, some oligomers in accordance with the present invention have both a freeze temperature and a melt temperature below 0° C. In other preferred embodiments, the non-crystalline oligomer has no observable freezing temperature, or melting temperature, above about −60° C.

The semi-crystalline and non-crystalline polyols useful to form the oligomer are not narrowly critical, however, each type of polyol should be selected so that, when combined with one another and with the isocyanates to form an oligomer, the resulting oligomer has no observable freezing temperature or melting temperature above about −60° C, or the oligomer will freeze at a temperature below about 0° C. or it will melt at a temperature below 0° C., or it will both freeze and melt at a temperature below 0° C. In general, semi-crystalline polymers are polymers for which a first order transition is observed by differential scanning calorimetry. Semi-crystalline polyols are well known in the art, and include polyols that form a solid at room temperature, e.g., about 25° C. Illustrative of semi-crystalline polyols which are suitable for use in the preparation of the oligomer include poly(tetramethylene oxide), polycarbonates (for example Duracarb polyols from PPG industries, and CD220 from Daciel Chemical Industries, LTD.), polycarbonate diols (for example poly(carbonyldioxyl,4-phenyleneisopropylidene-1,4-phenylene)), polyesters (for example poly(3-3'-dimethyloxetane), and poly(ethylene terephthalate)), and polyamides (for example amine terminated polycaprolactam, poly(hexamethylene adipamide), and poly (hexamethylene sebacamide)).

Semi-crystalline polyols suitable for use in the present invention typically have an hydroxyl number of from about 28 to about 200, and preferably of from about 40 to about 190, and more preferably from about 50 to about 180. The molecular weight of the semi-crystalline polyols suitable for use in the practice of the present invention is typically of from about 200 to about 2,000. Most preferably, the semi-crystalline polyols have a hydroxyl number of about 170, and a molecular weight of about 650.

Preferred semi-crystalline polyols are poly(tetramethylene oxide) polyols, in particular poly THF diols with a molecular weight between 500–4000, more preferred between about 650 and about 2000. Suitable examples of poly THF diols are poly THF diols with a molecular weight of about 650, about 1000 or about 2000.

Non-crystalline polyols are also well known in the art, and include polyols that remain liquid at room temperature, e.g., about 25° C. Illustrative of non-crystalline polyols which are suitable for use in the preparation of the oligomer include polyether polyols, such as, for example, polypropylene glycol, copolymers of propyleneglycol and up to 30% by wt. of ethyleneglycol, copolymers of THF with methyl-THF, also known as LPTGL polyols, polyoxyethylene glycols, polyoxypropylene glycols (for example poly(3-ethyl, 3'-methyl oxetane)), some polyester polyols (for example polycaprolactone), polydimethylsiloxane, polystyrene, some polycarbonates (for example poly (carbonyldioxyethylene) and PC-1733 from Stahl Inc.), and acrylated acrylics (for example U.S. Pat. No. 5,847,021, which is incorporated herein by reference).

Non-crystalline polyols suitable for use in the present invention have an hydroxyl number of from about 5 to about 60, preferably of from about 10 to about 50, and more preferably of from about 20 to about 40. The molecular weight of the non-crystalline polyols suitable for use in the practice of the present invention is typically of from about 900 to about 10,000. Most preferably, the non-crystalline polyols have an hydroxyl number of 29 and a molecular weight of about 2000.

Preferred non-crystalline polyols are polypropylene glycol, copolymers of THF with methyl-THF (LPTGL) and polyester polyols. Preferred molecular weights are between about 900–8000, more preferred between about 1000–5000.

It has been found that an oligomer comprised of a combination of semi-crystalline and non-crystalline polyols has the desired low temperature stability, as described above. The precise mole ratio of semi-crystalline and non-crystalline polyols used to prepare the oligomer used in the oligomer is not narrowly critical. It is preferred that the mole ratio between the semi-crystalline to the non-crystalline polyol is about 1, or higher (i.e., more non-crystalline polyol) with the proviso that on average 1 mole of non-crystalline oligomer is incorporated in each oligomer molecule. In a further embodiment, the mole ratio of semi-crystalline to non-crystalline polyol used to make the oligomer is desirably at least about 1:1. Preferably, the mole ratio of semi-crystalline polyol to non-crystalline used to make the oligomer is from about 1:1 to about 1:6, most preferably the ratio is from about 1:1 to about 1:3.

The reactive functionality terminus is reactive when exposed to actinic radiation. Preferably, the radiation-curable reactive-functionality terminus includes ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, N-vinyl, or styrene functionality, most preferably acrylate functionality.

Radiation-curable compositions may also contain a reactive diluent which is used to adjust the viscosity. The reactive diluent can be a low viscosity monomer having at least one functional group capable of polymerization when exposed to actinic radiation. This functional group may be of the same nature as that used in the radiation-curable oligomer. Preferably, the functional group present in the reactive diluent is capable of copolymerizing with the radiation-curable functional group present on the radiation-curable oligomer.

More preferably, the radiation-curable functional group forms free radicals during curing which can react with the free radicals generated on the surface of the surface treated optical fiber.

For example, the reactive diluent can be a monomer or mixture of monomers having an acrylate or vinyl ether functionality and a $C_4$–$C_{20}$ alkyl or polyether moiety. Particular examples of such reactive diluents include:

hexylacrylate,
2-ethylhexylacrylate,
isobornylacrylate,
decylacrylate,
laurylacrylate,
stearylacrylate,
2-ethoxyethoxy-ethylacrylate,
laurylvinylether,
2-ethylhexylvinyl ether,
isodecyl acrylate,
isooctyl acrylate,
N-vinyl-caprolactam,
N-vinylpyrrolidone,
tripropylene glycol acrylate,
acrylamides, and the alkoxylated derivatives, such as, ethoxylated lauryl acrylate, ethoxylated isodecyl acrylate, and the like.

Another type of reactive diluent that can be used is a compound having an aromatic group. Particular examples of reactive diluents having an aromatic group include:

ethyleneglycolphenyletheracrylate,
polyethyleneglycolphenyletheracrylate,
polypropyleneglycolphenyletheracrylate, and
alkyl-substituted phenyl derivatives of the above monomers, such as polyethyleneglycolnonylphenyletheracrylate.

The reactive diluent can also comprise a diluent having two or more functional groups capable of polymerization. Particular examples of such diluents include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetriacrylate,
hexanedioldivinylether,
triethylene-glycoldiacrylate,
pentaerythritol-triacrylate,
ethoxylated bisphenol-A diacrylate, and
tripropyleneglycol diacrylate.

Other additives which can be used in the coating composition include, but are not limited to, catalysts, lubricants, wetting agents, antioxidants and stabilizers. The selection and use of such additives is within the skill of the art.

Single coatings can also be made with the oligomer described herein. Exemplary single coatings are disclosed in, for example, U.S. Pat. No. 4,932,750, which is hereby incorporated by reference. Single coatings also generally comprise oligomer, reactive diluent, and optional photoinitiator and additives. Conventional outer primary coatings can be used in the practice of this invention as disclosed in, for example, U.S. Pat. No. 4,472,019, which is hereby incorporated by reference.

The inner primary composition can contain an adhesion promoter which has glass-binding groups that are capable of bonding to optical glass fiber under the curing conditions for the particular application of the inner primary composition to the optical glass fiber, such as, for example, the adhesion promoters described in U.S. Pat. No. 5,812,725, which is hereby incorporated by reference. Such inner primary coating compositions containing adhesion promoters can be used in this invention, but the use of an adhesion promoter may be unnecessary.

The inner primary coating, the outer primary coating, single coating, buffering coating and ink base composition and matrix materials further comprise a photoinitiator or mixture of photoinitiators to facilitate one of the compositions upon exposure to active radiation, and to provide a satisfactory cure rate. Illustrative of photoinitiators useful in the coating composition of the present invention are:

isobutyl benzoin ether;
2,4,6-trimethylbenzoyl, diphenylphosphine-oxide;
1-hydroxycyclohexylphenyl ketone;
2-benzyl-2-dimethylamino-1-(4-morpholinophenyl)-butan-1-one;
2,2-dimethoxy-2-phenylacetophenone;
perfluorinated diphenyl titanocene;
2-methyl-1-[4-(methylthio)phenyl]-2-(4-morpholinyl)-1-propanone;
2-hydroxy-2-methyl-1-phenyl propan-1-one;
4-(2-hydroxyethoxy)phenyl2-hydroxy-2-propyl ketone dimethoxyphenylacetophenone;
1-(4-isopropylphenyl)2-hydroxy-2-methylpropan-1-one;
1-(4-dodecyl-phenyl)-2-hydroxy-2-methylpropan-1-one;
4-(2-hydroxyethoxy)phenyl2(2-hydroxy-2-propyl)-ketone;
diethoxyphenyl acetophenone;
a mixture of (2,6-dimethoxy benzoyl)-2,4,4 trimethylpentylphosphineoxide and 2-hydroxy-2-methyl-1-phenyl-propan-1-one;
benzophenone;
1-propanone, 2-methyl-1-1-(4-(methylthio)phenyl)2-(4-morpholinyl); and
mixtures thereof.

The coating composition according to the invention will desirably have properties such as modulus, tensile strength and elongation suitable for coating optical fiber. For example, for a primary coating composition, the secant modulus is desirably less than 10 MPa, preferably of from about 0.1 MPa to about 5 MPa, and most preferably of from about 0.3 MPa to about 3 MPa, the tensile strength is desirably less than 10 MPa, preferably of from about 0.1 MPa to about 5 MPa, and most preferably of from about 0.5 MPa to about 3 MPa, and the elongation is desirably of from about 20 to about 300%, preferably of from about 75 to about 150% and most preferably about 100%.

For a secondary coating composition, the secant modulus is desirably from about 200 MPa to about 2000 MPa, preferably of from about 400 MPa or more, and most preferably of from about 500 MPa or more. Preferably, the secant modulus is about 1000 MPa. The elongation is desirably of from about 10 to about 80%, preferably of from about 10 to about 60% and most preferably of from about 15 to about 30%.

For a matrix material, the secant modulus is desirably of from about 10 to about 2000 MPa, preferably of from about 15 MPa to about 1000 MPa, and most preferably of from about 20 MPa to about 800 MPa. The tensile strength is desirably less than 10 MPa, preferably of from about 0.1 MPa to about 5 MPa, and most preferably of from about 0.5 MPa to about 3 MPa. The elongation is desirably of from about 2 to about 200%, preferably of from about 5 to about 50% and most preferably of from about 10 to about 40%.

For an ink base coating composition, the secant modulus is desirably of from about 1000 MPa to about 2000 MPa, and preferably of from about 1300 MPa to about 1500 MPa. The elongation is desirably of from about 0% to about 5%, and preferably of from about 0% to about 2%.

Ribbon assemblies are now well known in the art and one skilled in the art will easily be able to use the disclosure provided herein to prepare a novel ribbon assembly containing at least one of the improved coated optical fibers of the present invention for the desired application. The novel ribbon assembly made according to this invention can be used in telecommunication systems. Such telecommunication systems typically include ribbon assemblies containing optical fibers, transmitters, receivers, and switches. The ribbon assembly containing the coated optical fiber of the present invention is the fundamental connecting unit of a telecommunications system. The ribbon assembly can be buried underground, or it can be laid under water, for long distance connections, such as between cities. The ribbon assembly can also be used to connect directly to residential homes.

The novel ribbon assembly made according to this invention can also be used in cable television systems. Such cable television systems typically include ribbon assemblies containing optical fibers, transmitters, receivers and switches. The ribbon assembly containing the coated optical fibers of the present invention are the fundamental connecting units of such cable television systems. The ribbon assembly can be buried under ground or laid under water for long distance connections, such as between cities. The ribbon assembly can also be used to connect directly to residential homes.

The invention will be further explained by way of the following examples, without being limited thereto.

In the Examples, the following abbreviations and names are identified chemically, as follows:

VC: vinyl caprolactam;
IDA: isodecyl acrylate;
TPGDA: tripropylene glycol diacrylate;
ENPA: ethoxylated nonyl phenol acrylate
HEA: hydroxyethyl acrylate;
DBTDL: dibutyltindilaurate;
BHT: is a preservative;
PTHF: polytetrahydrofuran or poly(tetramethylene oxide)
PPG: polypropylene glycol;
Photoinitiator: phenyl bis(2,4,6-trimethyl benzoyl) phosphine oxide;
Stabilizer: bis[3,3-bis(4'-hydroxy-3'-t-butylphenyl) bis butanoic acid]-glycol ester
Silane: γ-mercaptopropyltrimethoxysilane;

EXAMPLES 1–8

Oligomers in accordance with the invention, using the isocyanates, endcapping compound, polyols, diluent, catalyst and inhibitor set forth in Table I below, were prepared as follows:

Inhibitor, diluent and isocyanate were added to a reaction vessel blanketed with air and maintained at ambient temperature (about 18° C.). The endcapping compound was added to the reaction vessel while the reaction vessel was cooled in a water bath, keeping the temperature below 40° C. to allow the endcapping compound to react with the isocyanate. The isocyanate was thus capped with the reactive functionality-terminus supplied by the endcapping compound. The reaction vessel containing the isocyanate with reactive terminus was then reacted sequentially with the semi-crystalline and non-crystalline polyols in the presence of catalyst. First, semi-crystalline polyol was added to the reaction vessel all at once. After the exotherm, non-crystalline polyol was added to the reaction vessel. After the addition of the non-crystalline polymer was complete, the reaction vessel was heated to approximately 79° C. for approximately 2 hours while stirring. The reaction was completed when the unreacted isocyanate level was found to be less than 0.2% by calorimetric titration.

The controls, Examples 9–11, were made the same way. However, the controls were made using only polyether or only polytetramethylene glycol.

TABLE I

| Component | Name | 1 | 2 | 3 | 4 | 5 | 6 | 7 | 8 | 9 | 10 | 11 |
|---|---|---|---|---|---|---|---|---|---|---|---|---|
| Isocyanate | TDI | 6.45 | 9.74 | | 5.64 | | 6.96 | 4.31 | | | | 28.13 |
| End capper | HEA | 4.31 | 3.26 | 3.16 | 3.77 | 1.69 | 4.65 | 2.88 | 1.80 | 8.75 | 2.53 | 18.84 |
| Isocyanate | IPDI | 8.24 | | 12.06 | 7.20 | 6.44 | 8.88 | 5.51 | 6.88 | 16.71 | 4.84 | |
| Polyol #1 | PTHF650 | 24.20 | 18.27 | 17.71 | 21.17 | 9.46 | | | | | | 52.85 |
| | PTHF1000 | | | | | | 39.84 | 24.71 | 15.43 | | | |
| Polyol #2 | PPG2000 | 36.65 | | | | | 39.52 | | | 74.39 | | |
| | PPG4000 | | 53.58 | 51.92 | 62.07 | | | 47.44 | | | | |
| | PPG8000 | | | | | 61.56 | | | 65.74 | | 92.48 | |
| Diluent | IDA | 20.00 | | | | 20.70 | | | 10.00 | | | |
| | SR504 | | 15.00 | 15.00 | | | | 15.00 | | | | |
| Catalyst | DBTDL | 0.09 | 0.09 | 0.09 | 0.09 | 0.09 | 0.09 | 0.09 | 0.09 | 0.09 | 0.09 | 0.08 |
| Inhibitor | BHT | 0.06 | 0.06 | 0.06 | 0.06 | 0.06 | 0.06 | 0.06 | 0.06 | 0.06 | 0.06 | 0.10 |
| | | 100 | 100 | 100 | 100 | 100 | 100 | 100 | 100 | 100 | 100 | 100 |

EXAMPLES 12–22

A primary coating composition was made with each of the oligomers 1–11. The coating formulation is set forth in Table II as follows:

TABLE II

| Component | Percentage |
|---|---|
| Oligomer | 65 |
| VC | 6 |
| IDA | 17 |
| ENPA | 5.3 |
| TPGDA | 3.7 |
| Photoinitiator | 1.5 |
| Stabilizer | 0.5 |
| Silane | 1 |

The coating compositions were tested for freezing point, tensile strength, elongation and modulus. The results are set forth in Table III.

EXAMPLES 23

A further primary coating was made using 55 wt % of oligomer composition 9 and 12 wt % phenoxy ethyl acrylate, 7 wt % VC, 20 wt % ENPA, 3 wt % TPG DA and photoinitiator, stabilizer and silane as in Table II. The oligomer did not crystallize after three days at −20° C, nor did the coating composition. Other results are set forth in Table III.

EXAMPLE 24

An oligomer was made in a process analogous to the process used for making oligomers 1–9. The oligomer was made from a polyester (Priplast 3190) as non-crystalline polyol, poly THF (650) as crystalline polyol and a 1:2 mixture of TDI and IPDI. The resulting oligomer—in 10% IDA—did not crystallize after two weeks at 0° C.

Comparative Example

A primary coating composition was made in accordance with the prior art, using the following formulation. The coating composition was made with a semi-crystalline oligomer.

TABLE IV

| RX04267 | 48.00 |
|---|---|
| IOMP | 0.50 |
| A-1110 | 0.01 |
| A189 | 0.50 |
| Irg. 1035 | 1.00 |
| Irg. 184 | 6.00 |
| LA | 12.00 |
| SR504 | 31.99 |

It has been found by differential scanning calorimetry that the coating composition made in accordance with the prior art had a freezing temperature of about −13° C, and a melting temperature of about 12.4° C.

All of the references cited herein, including patents, patent applications, and publications, are hereby incorporated in their entireties by reference.

TABLE III

| | 12 | 13 | 14 | 15 | 16 | 17 | 18 | 19 | 20 | 21 | 22 | 23 |
|---|---|---|---|---|---|---|---|---|---|---|---|---|
| Freezing test (DSC): freezing point, °C | NOB[1] | NOB | NOB | NOB | NOB | NOB | NOB | NOB | NOB | NOB | NOB | NOB |
| Peak tan delta | −17.5° C. | −22.0° C. | −23.1° C. | −22.0° C. | −21.4° C. −59.2° C. | −26.6° C. | −26.9° C. | −59° C. −28° C. | −15.4° C. | −57.7° C. −35° C. | 18.1° C. | −7° C. |
| Tensile (MPa) | 1.3 | 0.67 | 0.54 | 0.6 | 0.17 | 1.33 | 0.76 | 0.37 | 1.44 | 0.53 | 5.41 | 1.3 |
| Elongation (%) | 126.98 | 93.33 | 107.1 | 117.66 | 185.84 | 143.09 | 146.39 | 205.87 | 85.75 | 185.56 | 67.59 | 132 |
| Modulus (MPa) | 1.72 | 1.12 | 1 | 0.99 | 0.304 | 1.7 | 1.1 | 0.44 | 2.69 | 0.67 | 10.89 | 2.1 |

[1]NOB denotes no observable freezing temperature and no observable melting temperature above −60° C.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A radiation-curable coating composition for an optical fiber comprising a reactive functionality-terminated urethane oligomer, wherein said oligomer comprises the reaction product of (i) a semi-crystalline polyol having a molecular weight of from about 200 to about 1000, and (ii) a non-crystalline polyol in the mole ratio of semi-crystalline polyol to non-crystalline polyol of between about 10:1 and 1:10, wherein said non-crystalline polyol is selected from the group consisting of polyether polyols, polyester polyols, polydimethylsiloxane, polystyrene, polycarbonates, acrylated acrylics, or combinations thereof, (iii) at least one isocyanate, and (iv) an endcapping compound capable of supplying the reactive functionality terminus, and wherein the stoichiometry is selected such that, on average, about 50% or more of the oligomer contains a non-crystalline polyol, said coating composition having a freezing temperature below 0° C.

2. The composition of claim 1, wherein said composition has a melting temperature below 0° C.

3. The composition of claim 1, wherein the non-crystalline polyol has a molecular weight of from about 900 to about 10,000, and an hydroxyl number of from about 5 to about 60.

4. The composition of claim 1, wherein said semi-crystalline polyol is poly(tetramethylene oxide).

5. The composition of claim 1, wherein said non-crystalline polyol is selected from the group consisting of polypropylene glycol, polytetrahydrofuran-methyltetrahydrofuran, polyester or combinations thereof.

6. The composition of claim 1, wherein the mole ratio of semi-crystalline polyol to non-crystalline polyol is from about 3:1 to about 1:6.

7. The composition of claim 1, wherein said isocyanate is selected from the group consisting of an aromatic isocyanate, an aliphatic isocyanate and mixtures thereof.

8. The composition of claim 1, wherein said composition further comprises at least one reactive diluent, said reactive diluent including at least one group capable of reacting with the reactive functionality terminus of the urethane oligomer and a photoinitiator.

9. The composition of claim 1, wherein said endcapping compound is selected from the group consisting of acrylate, methacrylate, styrene, vinylether, vinyl ester, N-substituted acrylamide, N-vinyl amide, maleate esters, and fumarate esters.

10. The composition of claim 1, wherein said composition further comprises at least one adhesion promoter.

11. The coating composition of any one of claims 1, 2, 3 or 7, wherein said composition is an inner primary coating, said composition, after cure, having a tensile modulus of from about 0.1 to about 10 MPa.

12. The coating composition of any one of claims 1, 2, 3 or 7, wherein said composition is an outer primary coating.

13. A radiation-curable coating composition for an optical fiber comprising a reactive functionality-terminated urethane oligomer, wherein said oligomer comprises the reaction product of (i) a semi-crystalline polyol having a molecular weight of from about 200 to about 1000, and (ii) a non-crystalline polyol in the mole ratio of semi-crystalline polyol to non-crystalline polyol of at least about 1:1, wherein said non-crystalline polyol is selected from the group consisting of polyether polyols, polyester polyols, polydimethylsiloxane, polystyrene, polycarbonates, acrylated acrylics, or combinations thereof, (iii) at least one isocyanate, and (iv) an endcapping compound capable of supplying the reactive functionality terminus, said coating composition having a freezing temperature below 0° C.

14. A radiation-curable coating composition for an optical fiber comprising a reactive functionality-terminated urethane oligomer, wherein said oligomer comprises the reaction product of (i) a semi-crystalline polyol, and (ii) a non-crystalline polyol in the ratio of semi-crystalline polyol to non-crystalline polyol of at least about 1:1, wherein said non-crystalline polyol is selected from the group consisting of polyether polyols, polyester polyols, polydimethylsiloxane, polystyrene, polycarbonates, acrylated acrylics, or combinations thereof, (iii) at least one isocyanate, and (iv) an endcapping compound capable of supplying the reactive functionality terminus, wherein the semi-crystalline polyol has a molecular weight of from about 200 to about 1,000, and the non-crystalline polyol has a molecular weight of from about 900 to about 10,000, and an hydroxyl number of from about 5 to about 60, said coating composition having a freezing temperature below 0° C. and a melt temperature below 0° C.

15. A coated optical fiber having an inner and outer primary coating and optionally an ink coating, wherein at least one of the coatings is a cured composition according to any one of claims 1, 13 or 14.

16. A ribbon comprising coated and optionally inked optical fibers, bonded or covered by a matrix material wherein the matrix material is a cured composition according to any one of claims 1, 13 or 14.

17. A reactive functionality-terminated urethane oligomer, wherein said oligomer comprises the reaction product of (i) a semi-crystalline polyol having a molecular weight of from about 200 to about 1000, and (ii) a non-crystalline polyol in the ratio of semi-crystalline polyol to non-crystalline polyol of at least about 1:1, wherein said non-crystalline polyol is selected from the group consisting of polyether polyols, polyester polyols, polydimethylsiloxane, polystyrene, polycarbonates, acrylated acrylics, or combinations thereof, (iii) at least one isocyanate, and (iv) an endcapping compound capable of supplying the reactive functionality terminus, said oligomer having a freezing temperature below 0° C.

18. A reactive functionality-terminated urethane oligomer, wherein said oligomer comprises the reaction product of (i) a semi-crystalline polyol having a molecular weight of from about 200 to about 1000, and (ii) a non-crystalline polyol in the ratio of semi-crystalline polyol to non-crystalline polyol of between about 10:1 to about 1:10, wherein said non-crystalline polyol is selected from the group consisting of polyether polyols, polyester polyols, polydimethylsiloxane, polystyrene, polycarbonates, acrylated acrylics, or combinations thereof, (iii) at least one isocyanate, and (iv) an endcapping compound capable of supplying the reactive functionality terminus, said oligomer having a freezing temperature below 0° C.

19. The oligomer of any one of claims 17 or 18, wherein said oligomer has a melt temperature below 0° C.

20. The oligomer of claim 19, wherein the non-crystalline polyol has a molecular weight of from about 900 to about 10,000, and an hydroxyl number of from about 5 to about 60.

21. The oligomer of claim 20, wherein said semi-crystalline polyol is poly(tetramethylene oxide).

22. The oligomer of claim 20, wherein said non-crystalline polyol is polypropylene glycol.

23. The coating composition of any of claims 1, 13 or 14, wherein said composition has no observable freezing temperature and no observable melting temperature above about −60° C.

* * * * *